United States Patent [19]
Hagiuda et al.

[11] Patent Number: 5,630,183
[45] Date of Patent: May 13, 1997

[54] CAMERA ACCESSORY MOUNTING AND FIXING DEVICE

[75] Inventors: Nobuyoshi Hagiuda, Yokohama; Hideki Matsui, Fujisawa; Masakuni Ohta, Tokyo, all of Japan

[73] Assignee: Nikon Corporation, Tokyo, Japan

[21] Appl. No.: 671,520

[22] Filed: Jun. 27, 1996

[30] Foreign Application Priority Data

Jul. 26, 1995 [JP] Japan .................. 7-190696

[51] Int. Cl.$^6$ ........................... G03B 11/00
[52] U.S. Cl. ........................... 396/198; 396/422
[58] Field of Search ................... 396/422, 198, 396/429, 529, 530, 533

[56] References Cited

U.S. PATENT DOCUMENTS

| | | | |
|---|---|---|---|
| 3,914,779 | 10/1975 | Terunuma | 354/295 |
| 4,251,147 | 2/1981 | Sugimori | 354/127 |
| 4,449,802 | 5/1984 | Nakamura | 354/416 |
| 4,740,804 | 4/1988 | Shands | 354/126 |
| 5,089,834 | 2/1992 | Nakasa et al. | 354/145.1 |

FOREIGN PATENT DOCUMENTS

| | | |
|---|---|---|
| 1-16085 | 5/1989 | Japan . |
| 2-95022 | 7/1990 | Japan . |
| 2-95023 | 7/1990 | Japan . |
| 4-50840 | 4/1992 | Japan . |

*Primary Examiner*—Safet Metjahic
*Assistant Examiner*—Nicholas T. Tuccillo

[57] ABSTRACT

A camera accessory mounting and fixing device, having an outer periphery of a mounting foot member to be inserted into an accessory shoe of a camera to which a camera accessory is fixed. The camera accessory mounting and fixing device has a clamping member which is engaged with the mounting foot member and clamps the mounting foot member to the accessory shoe. A cam member is engaged with the clamping member and rotates during an initial rotation of the clamping member. While the cam member is rotated, a stop pin is urged toward or away from a stop hole formed in the accessory shoe.

20 Claims, 5 Drawing Sheets

CAMERA ACCESSORY MOUNTING AND FIXING DEVICE

BACKGROUND OF THE INVENTION

1. Field of the Invention

The present invention relates to a camera accessory mounting and fixing device with a camera accessory shoe mounted thereon, and more particularly, to a camera accessory mounting and fixing device equipped with a mechanism which prevents a camera accessory from slipping out of the accessory shoe.

2. Description of the Related Art

Camera accessory mounting and fixing devices are known which have a mechanism to prevent a flash device and other camera accessories from slipping out of an accessory shoe. Examples of such devices are disclosed in Japanese Laid-Open Patent Publications JP-A-2-95022 and 2-95023.

In the camera accessory mounting and fixing devices disclosed in these publications, a position determining pin, capable of up and down movement, is assembled in a mounting foot member on the camera accessory side. In the clamping state of the clamp member of the camera accessory side, the clamp member of the camera accessory side prevents the camera accessory from slipping out of the accessory shoe by lowering the position determining stop pin.

In the above-mentioned camera accessory mounting and fixing devices, the position determining stop pin, assembled in the mounting foot member on the camera accessory side, is lowered in the position determining hole of the accessory shoe side. However, a problem occurs in that the camera accessory side, to prevent the mounting foot member of the camera accessory from slipping out of the accessory shoe, has to be completely locked in.

Even in the case that the position determining stop pin slips out from the position determining hole of the accessory shoe side, it does not completely unfasten the camera accessory side clamp member. In the incompletely unfastened state, when the clamp member of the camera accessory side could separate from the camera side accessory shoe, breakage, bending or other deformation of the position determining stop pin may occur, creating the risk that poor operation would arise.

SUMMARY OF THE INVENTION

Accordingly, it is an object of the present invention to solve the above-noted problems by providing a camera accessory mounting and fixing device which, through the rotation of a predetermined angle of a clamping member, a stop pin can be reliably inserted in and removed from a stop hole formed in a camera body.

Additional objects and advantages of the invention will be set forth in part in the description which follows and, in part, will be obvious from the description, or may be learned by practice of the invention.

The foregoing and other objects of the present invention are achieved by providing a camera accessory mounting and fixing device having a mounting foot member mounted in the accessory shoe of a camera to which a camera accessory is fixed, and a clamping member which clamps the outer periphery of the mounting foot member to the accessory shoe, the clamping member and the mounting foot member being screw connected. A stop pin is urged towards a stop hole formed in the camera body, and in addition, is located in the clamping member, and a cam member inserts and removes the stop pin in the stop hole by a rotation of a predetermined angle of the clamping member.

According to a first aspect of the present invention, the clamping member seats by a click mechanism in a concave unit formed in the camera accessory side of the clamping member, and a regulating unit (stop) which regulates the rotation of the cam member is formed in the camera accessory side.

The cam member is formed in a circular arcuate, form, at both ends, and a regulating surface is formed which contacts the regulating unit. The cam member fits in a resilient state in a stop unit formed in the camera accessory side of the clamping member. The interior of the cam member is formed in an arcuate shape, and the regulating surface which is brought into contact with the regulating member is formed in both its ends.

When the clamp member rotates through a predetermined angle, the stop pin is inserted and removed in the stop hole of the camera side by the cam member.

Using the click mechanism, the clamping member and the cam member are coupled and rotated only in an initial rotation, and the stop pin is inserted in and removed from the stop hole of the camera body by the cam member. Then, when the rotation of the cam member is limited by the regulating unit, only the clamping member, sliding alone, is rotated by the click mechanism.

Because the cam member fits in a resilient state in the stop unit formed in the camera accessory side of the clamping member, and the clamp member and the cam member are coupled and rotated only in the initial rotation, the stop pin is inserted and removed in the stop hole of the camera side by the cam member. Then, when the rotation of the cam member is limited the regulating unit, only the clamping member, sliding alone, is rotated.

According to a second aspect of the present invention, the cam member is frictionally engaged with the clamping member. As with the first aspect of the present invention, the clamping member and the cam member are coupled only during an initial rotation of the clamping member and the stop pin inserted and removed from the stop hole of the camera body by the cam member. Then, when the rotation of the cam member is limited by the regulating unit, only the clamping member rotates. Further, a finger catch may project outward from the cam member to rotate the cam member regardless of the rotation of the clamping member.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
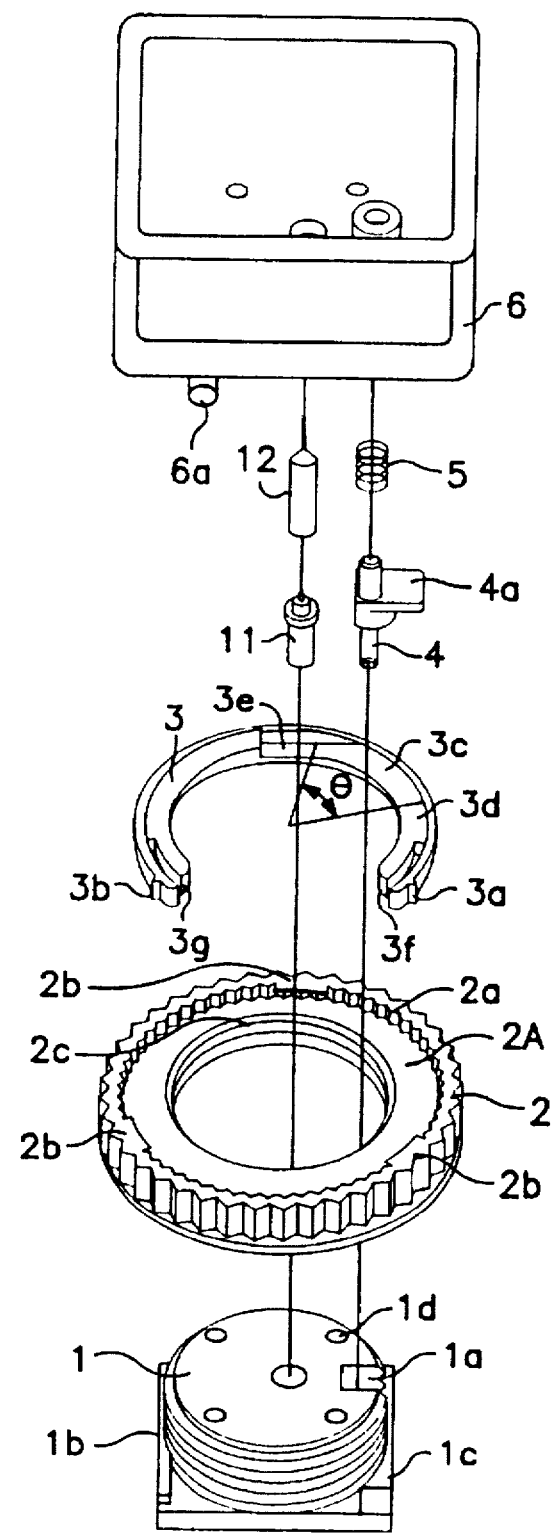
FIG. 1 is an exploded oblique view of a camera accessory mounting and fixing device according to a first embodiment of the present invention.

Reference will now made in detail to the present preferred embodiments of the present invention, examples of which are illustrated in the accompanying drawings, wherein like reference numerals refer to like elements throughout. The embodiments are described below in order to explain the present invention by referring to the figures.

Figure 2:
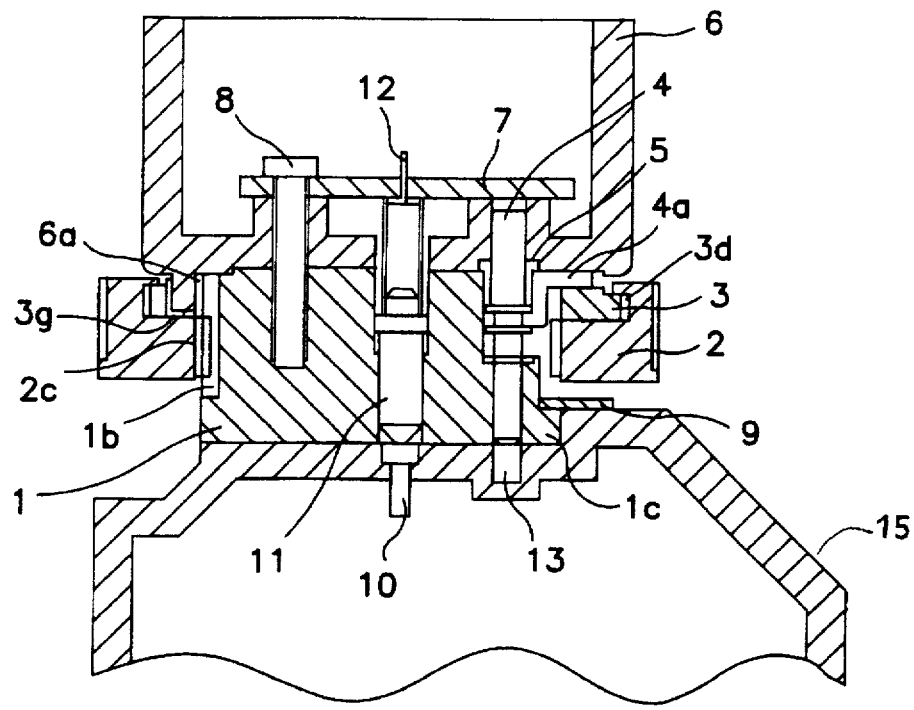
FIG. 2 is a sectional diagram showing a released state of a stop pin in the camera accessory mounting and fixing device of FIG. 1.
Figure 3:
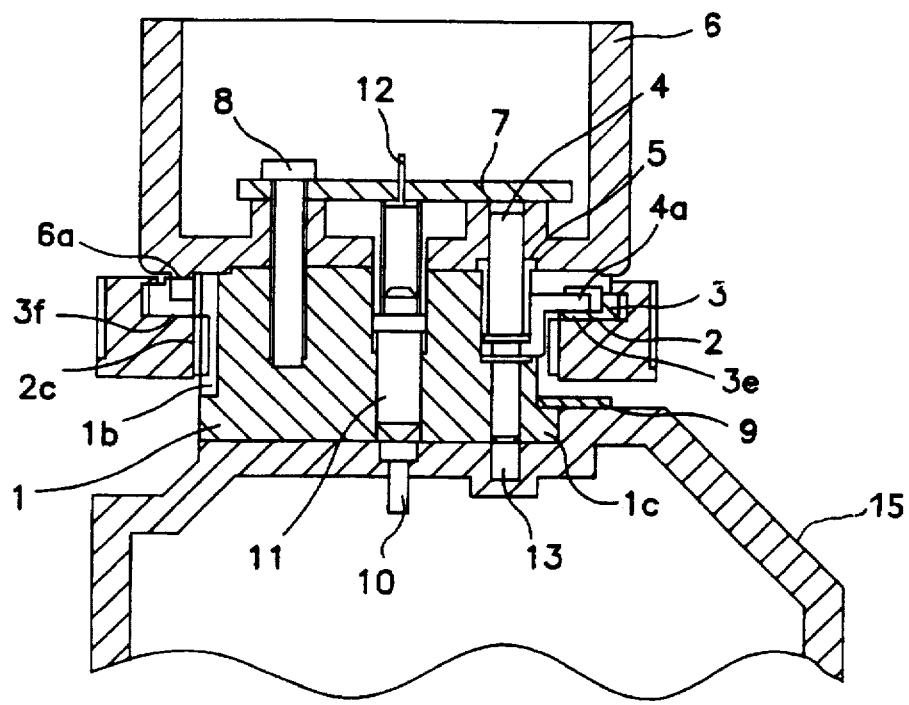
FIG. 3 is a sectional diagram showing an engaged state of the stop pin in the camera accessory mounting and fixing device of FIG. 1.

FIGS. 1 through 3 show a camera accessory mounting and fixing device according a first embodiment of the present invention. The camera accessory mounting and fixing device has a mounting foot member 1, a clamp ring 2, a cam ring 3, a stop pin 4, and an urging spring 5. A camera accessory body 6 mounts on the camera accessory mounting and fixing device.

The mounting foot member 1, as shown in FIGS. 2 and 3, is connected and fixed to the camera accessory body 6, which in this instance is a flash device, by a screw 8 via a support plate 7. An insertion unit 1c is formed in the mounting foot member 1 and is inserted in the accessory shoe 9 of the camera body 15, to be freely inserted and removed. A terminal pin 11 is located in the mounting foot member 1, and is brought into contact with an electrical contact point 10 of the camera body 15. The terminal 11 is biased by a coil spring 12 towards the electrical contact point 10. The other end of the coil spring 12 is electrically connected to an electrical circuit (not shown in the drawing) built into the camera accessory body 6.

The mounting foot member 1 has a cylindrical shape, wherein a groove aperture 1a (see FIG. 1) is formed on one side, to receive the stop pin 4. Along the outer circumference of the mounting foot member 1, a screw member 1b is formed which is in threaded engagement with a threaded portion 2c of the clamp ring 2. In the mounting foot member 1, there are actually four screws 8 which are in threaded engagement with four screw holes 1d.

The clamp ring 2 is annular in shape and an annular concave portion 2A is formed therein on the camera accessory 6 side (see FIG. 1). Thread grooves 2a are formed along the periphery of the concave portion 2A. The cam ring 3 is fitted in the interior of the camera portion 2A. At various places along the upper end of the concave portion 2A, hood portions 2b are formed in the clamp ring 2, to prevent the cam ring 3 from falling off. In the inner circumference of the clamp ring 2, the threaded portion 2c is formed which is in threaded engagement with the screw member 1b of the mounting foot member 1.

The cam ring 3 has a circular arcuate form, with click projecting elements 3a, 3b formed at the outside of respective both ends, for engagement in the thread grooves 2a of the clamp ring 2. An inclined cam surface 3c is formed in the cam ring 3 over an angular range θ, to move the stop pin 4 up and down. A top cam surface 3d is formed at one side of the inclined cam surface 3c, and includes the stop pin 4 disengagement upper surface position, while a lower cam surface 3e is formed at the other side, and includes the stop pin 4 engagement lower surface position.

Coupled rotation regulating surfaces 3f, 3g are disposed at both ends of the cam ring 3, to limit the range of rotation of the cam ring 3 in the clamping and releasing operations of the clamp ring 2. In this embodiment, the cam ring 3 is integrally molded from a plastic resin which has the spring characteristics of polyacetal, polypropylene, nylon, polyethylene and the like.

As a result, it becomes possible for the cam ring 3 to easily bend, and it becomes possible for the cam ring 3, in the bent state, to be easily inserted in the concave portion 2A of the interior of the clamp ring 2, underneath the hood portions 2b.

A guide projection 4a is formed on the stop pin 4, to guide the stop pin 4 along the inclined cam surface 3c. The urging spring 5 is located between the guide projection 4a of the stop pin 4 and the camera accessory 6, pressing the guide projection 4a onto the inclined cam surface 3c.

A stop unit (a small extension piece) 6a is disposed on the camera accessory body 6, and comes into contact with the coupled rotation regulating surfaces 3f, 3g of the cam ring 3, to regulate the range of rotation of the cam ring 3.

FIG. 2 shows the disengaged state of the stop pin 4 when the camera accessory mounting and fixing device has been inserted into the accessory shoe 9 of the camera body 15.

Namely, when the clamp ring 2, wherein the threaded portion 2c thereof is in threaded engagement with the screw member 1b of the mounting foot member 1, is initially rotated in the releasing direction, the cam ring 3, is coupled and rotates. During this time, the cam ring 3 is click engaged with the clamp ring 2.

By means of this coupled rotation, the guide projection 4a of the stop pin 4, urged by the urging spring 5 onto the lower cam surface 3e of the cam ring 3, is moved from the lower cam surface 3e of the cam ring 3 along the inclined cam surface 3c to the upper cam surface 3d. As a result, the position of the stop pin 4, formed integrally with the guide projection 4a, becomes in a disengaged state with respect to a stop hole 13 of the accessory shoe 9.

In this embodiment, the rotation angle of this interval, corresponding to the angle θ in FIG. 1, is about 90°. But by experimentally setting θ to 30°–150°, the disengagement operation of the stop pin 4 is easily performed, and the stop pin 4 is positively withdrawn from the stop hole 13.

After this time, when the rotation of the clamp ring 2 is further continued in the releasing direction, the coupled rotation regulating surface 3g of the coupled, rotating cam ring 3 comes into contact with the stop unit 6a of the camera accessory body 6, and the rotation of the cam ring 3 is stopped. Then, while the click projection elements 3a, 3b of the cam ring 3 click-slip between the thread grooves 2a of the clamp ring 2, only the clamp ring 2 is independently rotated to the final releasing position.

FIG. 3 shows the engaged state of the stop pin 4 when the camera accessory mounting and fixing unit has been inserted into the accessory shoe 9. Namely, when the clamp ring 2, wherein the threaded portion 2c thereof is in threaded engagement with the screw member 1b of the mounting foot member 1, is initially rotated in the releasing direction, the cam ring 3 is coupled and rotates. During this time, the cam ring 3 is click engaged with the clamp ring 2.

By means of this coupled rotation, the guide projection 4a of the stop pin 4, urged by the urging spring 5 onto the upper cam surface 3d of the cam ring 3, is moved from the upper cam surface 3d of the cam ring 3 along the inclined cam surface 3c to the lower cam surface 3e. Accordingly, the position of the stop pin 4, formed integrally with the guide projection 4a, becomes in an engaged state with respect to the stop hole 13 of the camera accessory shoe 9.

As stated previously, the rotation angle of this interval, corresponding to the angle θ in FIG. 1, is about 90°. But by experimentally setting θ to 30°–150°, the engagement operation of the stop pin 4 is easily performed, and the stop pin 4 is positively engaged in the stop hole 13.

When the rotation of the clamp ring 2 is further continued in the clamping direction, the rotation regulating surface 3f of the coupled, rotating cam ring 3 comes into contact with the stop unit 6a of the camera accessory body 6, and the rotation of the cam ring 3 is stopped. Then, while the click projection elements 3a, 3b of the cam ring 3 click-slip between the thread grooves 2a of the clamp ring 2, only the clamp ring 2 is independently rotated to the final clamping position.

It goes without saying that the angle of inclination of the inclined cam surface 3c of the cam ring 3 is set sufficiently larger than the angle of inclination of the threaded portion 2c of the clamp ring 2 which is in threaded connection to the screw member 1b of the mounting foot member 1.

In a camera accessory mounting and fixing device which has been constituted as hereinabove, coupled with the initial rotation movement of the clamping and releasing operation of the clamp ring 2, the stop pin 4 can be rapidly and completely engaged and disengaged with the stop hole 13 of the accessory shoe 9 of the camera.

As the stop pin 4 is normally urged by the urging spring 5 in the direction to fall into the stop hole 13, the camera accessory can be reliably prevented from coming out of the engaged state, because the stop pin 4 is biased in the stop direction even if vibrations or impacts are applied. Then, because the operating angle (the angle θ in FIG. 1) of the clamping and releasing of the clamp ring 2 can be set to be small, the engagement and disengagement of the stop pin 4 can be rapidly and reliably performed, and the risk of breakage or bending, etc., of the stop pin 4 can be reliably prevented.

Because it is possible to move the stop pin 4 up and down independently of the cam ring 3, a camera accessory body 6 can be mounted on, and removed from, the accessory shoe 9 of the camera body 15.

In the above-mentioned camera accessory mounting and fixing device, when the rotation of the cam ring 3 is restrained due to the coupled rotation regulating surface 3f or 3g coming into contact with the stop unit (extension piece) 6a of the camera accessory body 6, the click projections 3a, 3b slip between the thread grooves 2a and the click projection elements 3a, 3b of the cam ring 3. As a result, crisp clicking sounds are produced and only the clamp ring 2 rotates to the final clamping or releasing position.

Accordingly, the user can easily know, at the time when the crisp sounds are produced, whether the stop pin 4 is completely engaged in or released from the stop hole 13 of the accessory shoe 9 of the camera. By this means, for example, at the time when the clamping is released to the extent that the camera accessory can be detached, the disengaged state of the stop pin 4 is confirmed, and the camera accessory can be removed from the accessory shoe 9.

Figure 4:
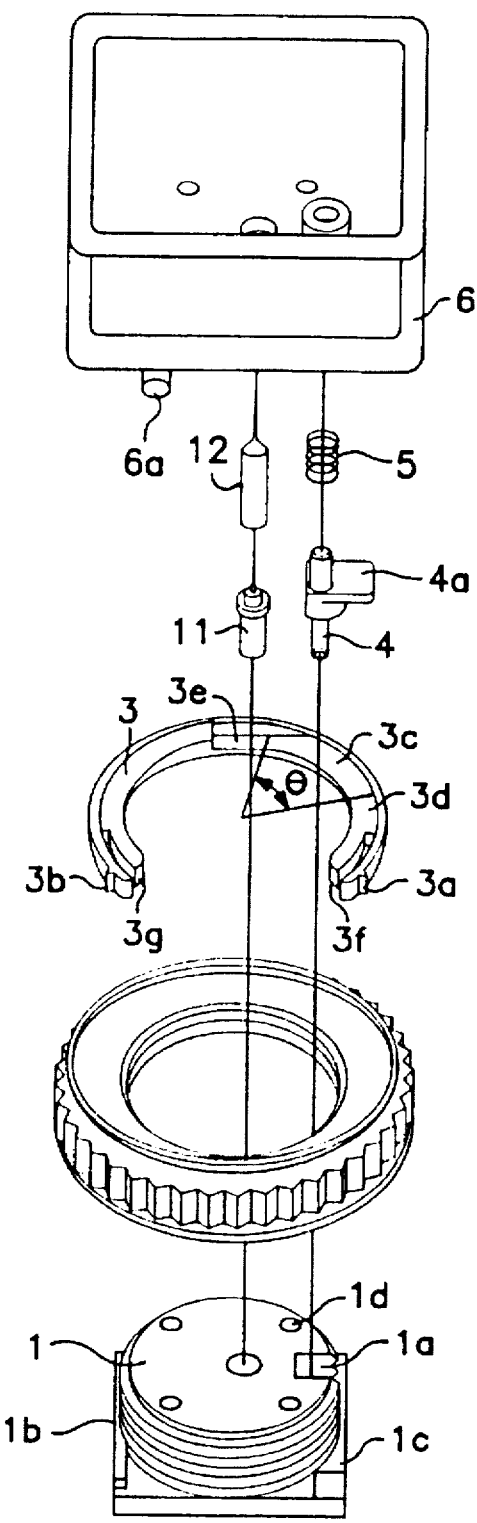
FIG. 4 is an exploded oblique view of a camera accessory mounting and fixing device according to a second embodiment of the present invention.
Figure 5:
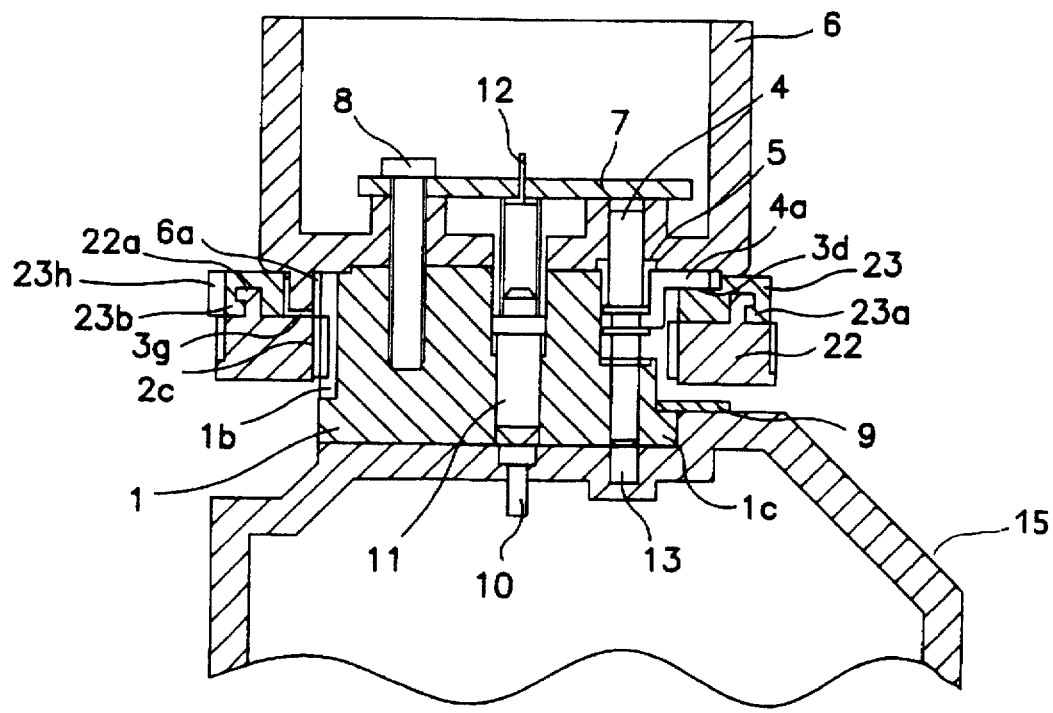
FIG. 5 is a sectional diagram showing a released state of a stop pin in the camera accessory mounting and fixing device of FIG. 4.
Figure 6:
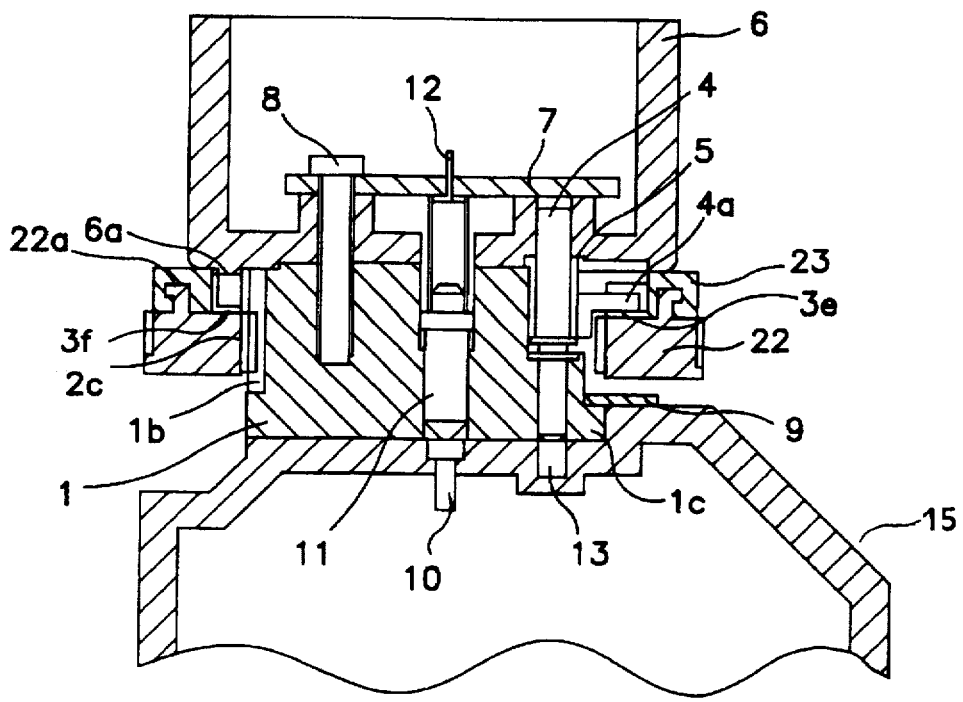
FIG. 6 is a sectional diagram showing an engaged state of the stop pin in the camera accessory mounting and fixing device of FIG. 4.

FIGS. 4, 5 and 6 show a camera accessory mounting and fixing device according to a second embodiment of the present invention. In this embodiment, the members which are the same as in the first embodiment have been given the same reference symbols, and detailed descriptions thereof are omitted.

In this second embodiment, a circumferential hook unit 22a which engages a cam ring 23 is formed on the camera accessory body 6 side of the clamp ring 22. In the cam ring 23, hook receiving units 23a, 23b fit into the circumferential hook unit 22a of the clamp ring 22. The hook receiving units 23a, 23b are formed paired in the circumference of the cam ring 23, and notch portion(s) 23i are formed in between. A cam unit 23A, having a circular arcuate shape, is formed in the inside of the cam ring 23, and coupled rotation regulating surfaces 3f, 3g are respectively disposed on each of its two ends to limit the range of movement of the cam ring 23 at the time of clamping and releasing movement of the clamp ring 22.

A finger catch unit 23h is disposed on the outer circumference of the cam ring 23, to perform the engagement and release of the stop pin 4 to and from the stop hole 13 of the accessory shoe 9, wherein the stop pin 4 is forcedly caused to move up and down by independently operating the cam ring 23.

In this second embodiment, the cam ring 23 is integrally molded from easily deformed, comparatively slippery plastic resins such as polyacetal, polypropylene, polycarbonate, polyethylene, or nylon.

Then, the assembly of the cam ring 23 to the clamp ring 22 is performed such that the hook receiving units 23a, 23b of the cam ring 23 forcibly surmount the circumferential hook unit 22a of the clamp ring 22, and are assembled in a positional relationship as shown in FIG. 5.

During this time, the notch 23i, formed between the hook receiving units 23a, 23b, allows for the easy deformation of the cam ring 23, thereby allowing the hook receiving units 23a, 23b to surmount the circumferential hook unit 22a.

In the shown assembled state of FIG. 5, the clamp ring 22 and the cam ring 23 rotate integrally due to the mutual frictional forces which arise between them, but in the case that a force exceeding the frictional forces is applied mutually therebetween, it is possible for them to rotate independently.

FIG. 5 shows the released state of the stop pin 4 from the stop hole 13 when the camera accessory mounting and fixing device has been inserted into the accessory shoe 9 of a camera. In this second embodiment, when the clamp ring 22, wherein the threaded portion 2c thereof is in threaded engagement with the screw member 1b of the mounting foot member 1, is initially rotated in the releasing direction, the cam ring 23 also is coupled and rotates, engaged with the clamp ring 22 by the frictional force with the circumferential hook unit 22a.

By the coupled rotation, the guide projection 4a of the stop pin 4, urged by the urging spring 5 on the lower cam surface 3e of the cam ring 3, moves from the lower cam surface 3e of the cam ring 23, along the inclined cam surface 3c, to the upper cam surface 3d. As a result, the position of the stop pin 4, which is formed integrally with the guide projection 4a, becomes in a released state with respect to the stop hole 13 of the accessory shoe 9 of the camera.

The rotation angle of this interval, corresponding to θ in FIG. 4, is about 90°, but by experimentally setting θ to 30°–150°, the release operation of the stop pin 4 is easily performed, and the stop pin 4 is accurately removed from the stop hole 13.

When the clamp ring 22 is further rotated in the releasing direction, the coupled rotation regulating surface 3g of the cam ring 23 rotates into contact with the stop unit 6a of the camera accessory body 6, and the rotation of the cam ring 23 is restrained.

Then, while a slipping action takes place between the circumferential hook unit 22a of the clamp ring 22 and the hook receiving units 23a, 23b of the cam ring 23, only the clamp ring 22 is rotated to the final release position.

FIG. 6 shows an engaged state of the stop pin 4 when the camera accessory mounting and fixing unit is inserted into the accessory shoe 9 of a camera. Namely, the threaded portion 2c of the clamp ring 22 is in threaded engagement with the screw member 1b of the mounting foot member 1. When initially caused to rotate in the clamping direction, the cam ring 23, which fits via a frictional force to the clamp ring 22, is also coupled and rotated.

As a result of this coupled rotation, the guide projection 4a of the stop pin 4, urged by the urging spring 5 onto the upper cam surface 3d of the cam ring 23, is moved from the upper cam surface 3d across the inclined cam surface 3c to the lower cam surface 3e. The position of the stop pin 4, formed integrally with the projection 4a, becomes in an engaged state with respect to the stop hole 13 of the accessory shoe 9.

The rotation angle of this interval, corresponding to the angle θ of FIG. 4, in this embodiment is about 90°. But by experimentally setting θ to 30°–150°, the engagement operation of the stop pin 4 is easily performed, and the stop pin 4 is accurately engaged in the stop hole 13.

When the clamp ring 22 is further rotated in the clamping direction, the coupled rotation regulating surface 3f of the cam ring 23 rotates into contact with the stop unit 6a of the camera accessory body 6, and the rotation of the cam ring 23 is restrained. Then, when the clamp ring 22 continues to be rotated in the clamping direction, the clamp ring 22 slips with respect to the cam ring 23 and rotates independently until it contacts the upper surface of the accessory shoe 9.

Figure 7:
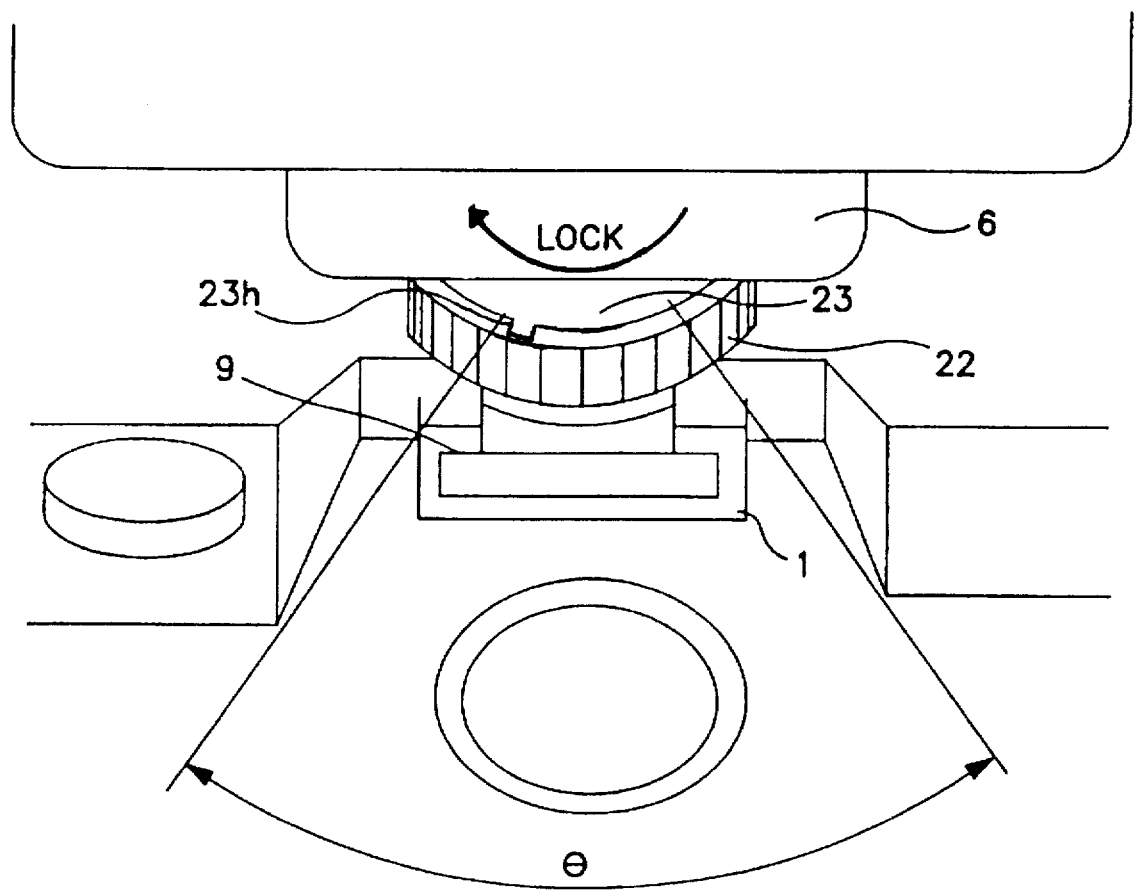
FIG. 7 is an oblique view showing the camera accessory mounting and fixing device of FIG. 4 when mounted in an accessory shoe.

FIG. 7 shows the camera accessory mounting and fixing device of FIG. 4 mounted in the accessory shoe 9 of a camera. In this second embodiment, by rotationally operating the finger catch unit 23h of the cam ring 23, it is normally possible to rotate the cam ring 23 alone, independently in a direction which causes the stop pin 4 to fall into the stop hole 13 (direction of the arrow of FIG. 7), or the direction which releases the stop pin 4 (reverse direction of the arrow of FIG. 7).

Accordingly, should the friction between the clamp ring 22 and the cam ring 23 be markedly reduced by raindrops soaking in between and the like, even in the anomalous case in which the cam ring 23 is not coupled and does not rotate during the clamping operation through the rotation of the clamp ring 22, it is possible to easily effect locking or release of the stop pin 4 by manual operation of the finger catch unit 23h. Additionally, by having the finger catch unit 23h located in a position for visual confirmation from the exterior, the user can feel a sense of relief, because it can be discriminated with a glance whether the stop pin 4 is in the locked state or the released state.

In the above-mentioned first and second embodiments, the present invention has been described in terms of being applied to a flash device, but the present invention is not limited to such embodiments, and can be broadly applied to a broad range of accessories for camera use.

Also, the clamp member and the cam member in the first and second embodiments are made annular in shape, but a mechanism can easily be considered for inserting the stop pin into the stop hole by a plate-form clamping member and a plate-form cam member, their operating direction being a linear direction.

In the camera accessory mounting and fixing devices as set forth in the foregoing, because the stop pin is inserted into a camera side stop hole by means of a cam member when the clamp ring rotates through a predetermined angle, the stop pin can be reliably inserted into and removed from the stop hole which is formed on the camera side.

Using a click mechanism, only the first stages of the rotation of the clamp member and the cam member are coupled and rotate simultaneously, because in the first stages of the rotation, the stop pin is inserted in and removed from a stop hole of the camera side by the cam member. The cam member has a circular arcuate form, because regulating surfaces, which contact a regulating (stop) unit of the camera accessory body, are respectively formed at both ends of the cam ring, and these regulating surfaces can easily be formed.

Because the clamp member and the cam member are coupled and rotate only in the initial stages of rotation, and the stop pin is inserted in and removed from a stop hole of the accessory shoe by the cam member in the initial states of rotation, the stop pin is inserted in and removed from the stop hole formed in the accessory shoe of the camera during these initial stages. As a result of the regulating surfaces, which are respectively formed at both ends of the cam member, the interior of the cam member is formed in a circular arcuate shape.

In addition, the camera accessory mounting and fixing device may have a finger catch unit, which is integrally formed on a cam ring, thereby allowing the cam ring to rotate independently. Through the rotation of the cam ring by the finger catch unit, the stop pin may be inserted into or removed from the stop hole in the accessory shoe of the camera.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera accessory mounting and fixing device for mounting and fixing a camera accessory to an accessory shoe of a camera body, wherein the accessory shoe has a stop hole, the camera accessory mounting and fixing device comprising:

a mounting foot member mountable in the accessory shoe and having a threaded portion;

a clamping member having a screw member to engage said threaded portion of said mounting foot member;

a stop pin biased towards the stop hole; and a cam member engaging said clamping member and said stop pin, to insert the stop pin into and remove the stop pin from the stop hole via rotation of the clamping member.

2. The camera accessory mounting and fixing device as claimed in claim 1, further comprising:

a regulating unit connected to the camera accessory; wherein said clamping member has a concave portion with a periphery of thread grooves, and said cam member is placed in said concave portion and has click projections which engage ones of said thread grooves, said regulating unit regulating the amount of movement of said cam member in said concave portion.

3. The camera accessory mounting and fixing device as claimed in claim 2, wherein said cam member has a circular arcuate shape with regulating surfaces at respective ends, said regulating unit alternately contacting said regulating surfaces to stop the movement of said cam member in said concave portion after predetermined amounts of rotation of said clamping member.

4. The camera accessory mounting and fixing device as claimed in claim 1, further comprising:

a regulating unit connected to the camera accessory; wherein said clamping member has a circumferential hook unit which extends from a camera accessory side of said clamping member, and said cam member resiliently fits over said circumferential hook unit to frictionally engage said clamping member, said cam member having regulating surfaces at different locations, such that said cam member frictionally rotates via rotation of said clamping member during rotation within predetermined limits of said clamping member and said regulating unit preventing rotation of said cam member due to contact with either one of said regulating surfaces even while said clamping member rotates during rotation of said clamping member outside of said predetermined limits.

5. The camera accessory mounting and fixing device as claimed in claim 4, wherein said cam member has a circular arcuate shape.

6. The camera accessory mounting and fixing device as claimed in claim 4, wherein said cam member further comprises a finger catch which projects from a periphery of said cam member, and which rotates said cam member when manually rotated by a user.

7. A camera accessory mounting and fixing device connected to a camera accessory and for mounting and fixing the camera accessory to an accessory shoe of a camera body, wherein the accessory shoe has a stop hole, the camera accessory mounting and fixing device comprising:

a mounting foot member mountable in the accessory shoe;

a clamping member to engage said mounting foot member and to engage the accessory while said mounting foot member is mounted in the accessory shoe, thereby clamping said mounting foot member in place;

a cam member engaging said clamping member to move in conjunction with said clamping member;

a regulating unit to limit movement of said cam member relative to said clamping member during portions of movement of said clamping member; and a stop pin engaging said cam member and moved by movement of said cam member into and from the stop hole dependent upon the direction of movement of said cam member.

8. The camera accessory mounting and fixing device as claimed in claim 7, further comprising:

a guide projection extending from said stop pin;

wherein said cam member has an inclined surface to receive said guide projection, such that by biasing said stop pin toward the stop hole and moving said cam member, said guide projection moves along said inclined surface to move said stop pin toward and away from the stop hole.

9. The camera accessory mounting and fixing device as claimed in claim 7, wherein said mounting foot member has a groove aperture for receiving said stop pin and allowing said stop to extend into said stop hole.

10. The camera accessory mounting and fixing device as claimed in claim 7, further comprising a finger catching unit extending from said cam member, to be manually moved by a user to move said cam member regardless of movement of said clamping member.

11. The camera accessory mounting and fixing device as claimed in claim 7, further comprising:

an urging unit to bias said stop pin toward the stop hole; wherein said mounting foot member has a screw member, said clamping member has a threaded portion for engaging said screw member and a circular recess for receiving said cam member, said circular recess having thread grooves, said cam member has an arcuate shape and projections for engaging ones of said thread grooves to said cam member simultaneously with the movement of said clamping member, and said regulating unit contacting said cam member after predetermined amounts of movement of said clamping member, causing said cam member to stop moving relative to said clamping member and causing said projections to skip into other ones of said thread grooves of said clamping member.

12. The camera accessory mounting and fixing device as claimed in claim 11, further comprising:

a guide projection extending from said stop pin;

wherein said cam member has an inclined surface to receive said guide projection, such that by biasing said stop pin toward the stop hole and moving said cam member, said guide projection moves along said inclined surface to move said stop pin toward and away from the stop hole.

13. The camera accessory mounting and fixing device as claimed in claim 11, wherein when said projections skip into other ones of said thread grooves, sounds are generated to inform a user that said cam member is not moving relative to said clamping member.

14. The camera accessory mounting and fixing device as claimed in claim 11, further comprising:

an urging unit to bias said stop pin toward the stop hole; wherein said mounting foot member has a screw member, said clamping member has a threaded portion for engaging said screw member and a circular recess for receiving said cam member, said circular recess having thread grooves, said cam member has an arcuate shape, projections for engaging ones of said thread grooves to said cam member simultaneously with the movement of said clamping member, and regulating surfaces at the respective ends thereof, and said regulating unit contacting said regulating surfaces of said cam member after predetermined amounts of rotation of said clamping member, causing said cam member to stop moving relative to said clamping member and causing said projections to skip into other ones of said thread grooves of said clamping member.

15. The camera accessory mounting and fixing device as claimed in claim 11, further comprising:

an urging unit to bias said stop pin toward the stop hole; wherein said mounting foot member has a screw member, said clamping member has a threaded portion for engaging said screw member, and a circumferential hook unit, said cam member has an arcuate shape and a hook receiving unit for surmounting said circumferential hook unit, thereby creating a frictional engagement of said cam member with said clamping member wherein said cam member moves in conjunction with said clamping member, and said regulating unit contacting said cam member after predetermined amounts of movement of said clamping member, causing said cam member to stop moving relative to said clamping member.

16. The camera accessory mounting and fixing device as claimed in claim 15, further comprising:

a guide projection extending from said stop pin;

wherein said cam member has an inclined surface to receive said guide projection, such that by biasing said stop pin toward the stop hole and moving said cam member, said guide projection moves along said inclined surface to move said stop pin toward and away from the stop hole.

17. The camera accessory mounting and fixing device as claimed in claim 15, wherein said mounting foot member has a groove aperture for receiving said stop pin and allowing said stop to extend into said stop hole.

18. The camera accessory mounting and fixing device as claimed in claim 15, further comprising a finger catching unit extending from said cam member, to be manually moved by a user to move said cam member regardless of movement of said clamping member.

19. The camera accessory mounting and fixing device as claimed in claim 15, further comprising:

an urging unit to bias said stop pin toward the stop hole;

wherein said mounting foot member has a screw member, said clamping member has a threaded portion for engaging said screw member and a circumferential hook unit, said cam member has an arcuate shape, and a hook receiving unit for surmounting said circumferential hook unit, thereby creating a frictional engagement of said cam member with said clamping member wherein said cam member moves in conjunction with said clamping member, and regulating surfaces at the respective ends thereof, and said regulating unit extending from the camera accessory and contacting said regulating surfaces of said cam member after predetermined amounts of rotation of said clamping member, causing said cam member to stop moving relative to said clamping member and causing said projections to skip into other ones of said thread grooves of said clamping member.

20. The camera accessory mounting and fixing device as claimed in claim 19, further comprising a finger catching unit extending from said cam member, to be manually moved by a user to move said cam member regardless of movement of said clamping member.

* * * * *

UNITED STATES PATENT AND TRADEMARK OFFICE
CERTIFICATE OF CORRECTION

PATENT NO. : 5,630,183
DATED : May 13, 1997
INVENTOR(S) : Hagiuda et al.

It is certified that error appears in the above-indentified patent and that said Letters Patent is hereby corrected as shown below:

Title page,

Item [30] Foreign Application Priority Data
July 26, 1995 [JP] Japan ........ delete "7-190696"
and insert --7-190679--.

Signed and Sealed this

Twenty-sixth Day of August, 1997

Attest:

BRUCE LEHMAN

Attesting Officer     *Commissioner of Patents and Trademarks*